US011927232B2

(12) United States Patent
Bunazawa

(10) Patent No.: US 11,927,232 B2
(45) Date of Patent: Mar. 12, 2024

(54) DEGRADATION ESTIMATION DEVICE, DEGRADATION ESTIMATION METHOD, AND NON-TRANSITORY STORAGE MEDIUM

(71) Applicant: TOYOTA JIDOSHA KABUSHIKI KAISHA, Toyota (JP)

(72) Inventor: Hideaki Bunazawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 499 days.

(21) Appl. No.: 17/357,054

(22) Filed: Jun. 24, 2021

(65) Prior Publication Data

US 2022/0003289 A1 Jan. 6, 2022

(30) Foreign Application Priority Data

Jul. 2, 2020 (JP) .................................. 2020-114900

(51) Int. Cl.
*F16D 66/00* (2006.01)
*F16J 15/16* (2006.01)
*G07C 5/10* (2006.01)

(52) U.S. Cl.
CPC .............. *F16D 66/00* (2013.01); *F16J 15/16* (2013.01); *G07C 5/10* (2013.01);
(Continued)

(58) Field of Classification Search
CPC ............... F16D 66/00; F16D 2066/001; F16D 2066/005; F16D 2066/006;
(Continued)

(56) References Cited

U.S. PATENT DOCUMENTS

2007/0012117 A1* 1/2007 Hiroki .................... F16J 15/064
73/768
2011/0240747 A1* 10/2011 Stewart ............ G06K 19/07758
235/492

(Continued)

FOREIGN PATENT DOCUMENTS

JP 62-020998 A 1/1987
JP H05-296327 A 11/1993
(Continued)

*Primary Examiner* — Kenneth J Malkowski
(74) *Attorney, Agent, or Firm* — Oliff PLC

(57) ABSTRACT

A degradation estimation device includes a storage device and an execution device. The storage device is configured to store mapping data that defines a map that outputs an output variable indicating a degree of degradation of a seal member when an input variable is input. The map includes a thermal history variable and a load history variable as the input variable. The thermal history variable is a variable indicating a period during which the seal member has been exposed to a temperature within a predetermined temperature range. The load history variable is a variable indicating the number of times a load has acted on the seal member. The execution device is configured to perform an acquisition process of acquiring the input variable and a calculation process of outputting a value of the output variable by inputting the input variable acquired in the acquisition process to the map.

12 Claims, 3 Drawing Sheets

(52) U.S. Cl.
CPC .. *F16D 2066/001* (2013.01); *F16D 2066/005* (2013.01); *F16D 2066/006* (2013.01); *F16D 2066/008* (2013.01)

(58) Field of Classification Search
CPC ... F16D 2066/008; F16D 25/126; F16J 15/16; G07C 5/10; F16H 2059/725
See application file for complete search history.

(56) References Cited

U.S. PATENT DOCUMENTS

2019/0145702 A1\* 5/2019 Seidl .................... F25D 29/008
                                                73/49.2
2021/0018056 A1\* 1/2021 Baker .................... F16D 48/06

FOREIGN PATENT DOCUMENTS

| | | |
|---|---|---|
| JP | 2005-106137 A | 4/2005 |
| JP | 2011-169810 A | 9/2011 |
| WO | 2005/031195 A1 | 4/2005 |

\* cited by examiner

|     | C1 | C2 | B1 | B2 | F1 |
|-----|----|----|----|----|----|
| 1st | ○  |    |    | (○)| ○  |
| 2nd | ○  |    | ○  |    |    |
| 3rd | ○  | ○  |    |    |    |
| 4th |    | ○  | ○  |    |    |
| R   | ○  |    |    | ○  |    |

DEGRADATION ESTIMATION DEVICE, DEGRADATION ESTIMATION METHOD, AND NON-TRANSITORY STORAGE MEDIUM

CROSS-REFERENCE TO RELATED APPLICATION

This application claims priority to Japanese Patent Application No. 2020-114900 filed on Jul. 2, 2020, incorporated herein by reference in its entirety.

BACKGROUND

1. Technical Field

The present disclosure relates to degradation estimation devices, degradation estimation methods, and non-transitory storage media.

2. Description of Related Art

Japanese Unexamined Patent Application Publication No. 2011-169810 (JP 2011-169810 A) describes a degradation degree estimation device that estimates the degree of degradation of a resin material. This degradation degree estimation device acquires a temperature to which the resin material has been exposed and a period during which the resin material has been exposed to this temperature. The degradation degree estimation device predicts the degree of degradation of the resin material based on the acquired temperature and period.

SUMMARY

A resin material is sometimes used as seal members for engagement elements such as clutches of automatic transmissions of vehicles. In such a seal member, since a force that acts on the seal member changes according to the operating condition of the automatic transmission, the degree of degradation of the seal member also changes accordingly. Accordingly, the degradation degree estimation device of JP 2011-169810 A may not be able to ensure accuracy of estimation of the degree of degradation of the seal member.

A degradation estimation device of a first aspect of the present disclosure is applied to a vehicle equipped with an automatic transmission including either or both of a clutch and a brake as an engagement element and is configured to estimate a degree of degradation of a seal member attached to the engagement element of the automatic transmission. The degradation estimation device includes a storage device and an execution device. The storage device is configured to store mapping data that defines a map that outputs an output variable indicating the degree of degradation of the seal member when an input variable is input. The map includes a thermal history variable and a load history variable as the input variable. The thermal history variable is a variable indicating a period during which the seal member has been exposed to a temperature within a predetermined temperature range. The load history variable is a variable indicating the number of times a load has acted on the seal member. The execution device is configured to perform an acquisition process and a calculation process, the acquisition process being a process of acquiring the input variable, and the calculation process being a process of outputting a value of the output variable by inputting the input variable acquired in the acquisition process to the map.

According to the degradation estimation device of the first aspect of the present disclosure, the map outputs the degree of degradation of the seal member as the output variable in consideration of not only the period during which the seal member has been exposed to a temperature within the predetermined temperature range but also the number of times a load has acted on the seal member. Accordingly, for example, even when degradation of the seal member has progressed due to the engagement element having been operated many times, the map outputs the output variable reflecting the number of times the engagement element has been operated. As a result, the output variable more accurately reflecting degradation of the seal member can be obtained as compared to the case where the degree of degradation of the seal member is estimated without considering the number of times the engagement element has been operated.

In the degradation estimation device of the first aspect of the present disclosure, when the predetermined temperature range is a first temperature range and the thermal history variable is a first thermal history variable, the map may include a second thermal history variable as the input variable. The second thermal history variable may be a variable indicating a period during which the seal member has been exposed to a temperature within a second temperature range, the second temperature range being a predetermined temperature range different from the first temperature range.

According to the degradation estimation device of the first aspect of the present disclosure, at least two variables are input to the map as the thermal history variables. Accordingly, even when the way in which degradation of the seal member progresses changes significantly depending on the temperature, the probability that a value accurately reflecting degradation of the seal member may be obtained as the output variable is increased.

In the degradation estimation device of the first aspect of the present disclosure, when the predetermined temperature range is a first temperature range, the execution device may be configured to calculate a corrected period and acquire, as the thermal history variable, a variable indicating a sum of a period during which the seal member has been exposed to a temperature within the first temperature range and the corrected period in the acquisition process. The corrected period may be calculated by correcting a period during which the seal member has been exposed to a temperature within a second temperature range by a predetermined value, the second temperature range being a predetermined temperature range different from the first temperature range.

According to the degradation estimation device of the first aspect of the present disclosure, an increase in number of input variables to be input to the map can be prevented while taking into consideration the period during which the seal member has been exposed to a temperature within the second temperature range that is different from the first temperature range. This restrains the mapping data from becoming complicated.

In the degradation estimation device of the first aspect of the present disclosure, the load history variable may be the number of engagements, the number of engagements being the number of times the engagement element has been engaged since the seal member was attached to the engagement element. According to the degradation estimation device of the first aspect of the present disclosure, the number of times the engagement element has been engaged, which is a value having a high correlation with the degree of degradation of the seal member, is input as the input variable to the map.

Accordingly, a value accurately reflecting degradation of the seal member can be obtained as the output variable.

In the degradation estimation device of the first aspect of the present disclosure, the engagement element may include a first component and a second component. The first component and the second component may be configured to move relative to each other when the engagement element switches between an engaged state and a disengaged state. The seal member may be disposed in clearance between the first component and the second component. The seal member may be configured to slide along the second component when the first component moves relative to the second component. The load history variable may be the corrected number of engagements, the corrected number of engagements being obtained by correcting the number of engagements by a value indicating sliding resistance of the seal member along the second component, the number of engagements being the number of times the engagement element has been engaged since the seal member was attached to the engagement element.

According to the degradation estimation device of the first aspect of the present disclosure, the sliding resistance of the seal member, which may affect the degree of degradation of the seal member, is reflected in the load history variable. Accordingly, a value accurately reflecting degradation of the seal member according to the sliding resistance can be obtained as the output variable.

In the degradation estimation device of the first aspect of the present disclosure, the load history variable may be a distance traveled by the vehicle since the seal member was attached to the engagement element. According to the degradation estimation device of the first aspect of the present disclosure, the distance traveled by the vehicle, which has a high correlation with the degree of degradation of the seal member and which is easy to detect in the vehicle, is input as the input variable. Accordingly, the output variable accurately reflecting degradation of the seal member can be obtained without adding any new sensors etc. in order to implement the above technique.

In the degradation estimation device of the first aspect of the present disclosure, the map may include, as the input variable, a vehicle speed variable indicating an average vehicle speed of the vehicle since the seal member was attached to the engagement element. In the above configuration, there is a certain degree of correlation between the average vehicle speed of the vehicle and the frequency with which the automatic transmission shifts to each gear used in the vehicle. When the frequency with which the automatic transmission shifts to a certain gear is known, it is possible to estimate which engagement element has been engaged or disengaged with what frequency in order to attain that gear.

According to the degradation estimation device of the first aspect of the present disclosure, the average vehicle speed is input as the input variable. Accordingly, the frequency with which the engagement element having the seal member whose degree of degradation is to be estimated has been engaged or disengaged is reflected in the output variable.

In the degradation estimation device of the first aspect of the present disclosure, the engagement element may include a first component and a second component that are separated from each other, and the seal member may be disposed in clearance between the first component and the second component. The map may include, as the input variable, a clearance variable indicating a dimension of the clearance.

According to the degradation estimation device of the first aspect of the present disclosure, the output variable reflecting a variation in clearance between the first component and the second component due to manufacturing variation etc. can be obtained.

Accordingly, an accurate degree of degradation of the seal member can be obtained for each vehicle.

In the degradation estimation device of the first aspect of the present disclosure, the engagement element may include a first component and a second component that are separated from each other. The seal member may be disposed in a compressed state in clearance between the first component and the second component. The map may include, as the input variable, a compression variable indicating a difference between an uncompressed dimension of a part of the seal member that is to be located in the clearance and a dimension of the clearance.

According to the degradation estimation device of the first aspect of the present disclosure, the output variable reflecting how much the seal member is compressed can be obtained. Accordingly, even when there is a variation in dimension among the seal members, an accurate degree of degradation of the seal member can be obtained.

In the degradation estimation device of the first aspect of the present disclosure, the output variable may be a variable indicating hardness of the seal member. According to the degradation estimation device of the first aspect of the present disclosure, it is easy to objectively know not only whether the seal member has degraded but also the degree of degradation of the seal member by comparing the output variable or the hardness converted from the output variable with a standard value etc.

A degradation estimation method of a second aspect of the present disclosure is applied to a vehicle equipped with an automatic transmission including either or both of a clutch and a brake as an engagement element to estimate a degree of degradation of a seal member attached to the engagement element of the automatic transmission. The method includes: causing a degradation estimation device to calculate a value of an output variable by inputting a thermal history variable and a load history variable as an input variable to the degradation estimation device. The thermal history variable is a variable indicating a period during which the seal member has been exposed to a temperature within a predetermined temperature range. The load history variable is a variable indicating the number of times a load has acted on the seal member. The degradation estimation device stores mapping data. The mapping data defines a map that outputs the output variable indicating the degree of degradation of the seal member when the input variable is input.

According to the degradation estimation method of the second aspect of the present disclosure, the map outputs the degree of degradation of the seal member as the output variable in consideration of not only the period during which the seal member has been exposed to a temperature within the predetermined temperature range but also the number of times a load has acted on the seal member. Accordingly, for example, even when degradation of the seal member has progressed due to the engagement element having been operated many times, the map outputs the output variable reflecting the number of times the engagement element has been operated. As a result, the output variable more accurately reflecting degradation of the seal member can be obtained as compared to the case where the degree of degradation of the seal member is estimated without considering the number of times the engagement element has been operated.

A non-transitory storage medium of a third aspect of the present disclosure serves as a degradation estimation device applied to a vehicle equipped with an automatic transmission including either or both of a clutch and a brake as an engagement element and configured to estimate a degree of degradation of a seal member attached to the engagement element of the automatic transmission. The non-transitory storage medium includes mapping data defining a map that outputs an output variable indicating the degree of degradation of the seal member when an input variable is input. The non-transitory storage medium stores instructions that are executable by one or more processors and that cause the one or more processors to perform functions including: acquiring the input variable, the input variable including at least either a thermal history variable or a load history variable, the thermal history variable being a variable indicating a period during which the seal member has been exposed to a temperature within a predetermined temperature range, and the load history variable being a variable indicating the number of times a load has acted on the seal member; and calculating a value of the output variable by inputting the acquired input variable to the map.

According to the non-transitory storage medium of the third aspect of the present disclosure, the map outputs the degree of degradation of the seal member as the output variable in consideration of not only the period during which the seal member has been exposed to a temperature within the predetermined temperature range but also the number of times a load has acted on the seal member. Accordingly, for example, even when degradation of the seal member has progressed due to the engagement element having been operated many times, the map outputs the output variable reflecting the number of times the engagement element has been operated. As a result, the output variable more accurately reflecting degradation of the seal member can be obtained as compared to the case where the degree of degradation of the seal member is estimated without considering the number of times the engagement element has been operated.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figures 1, 2:
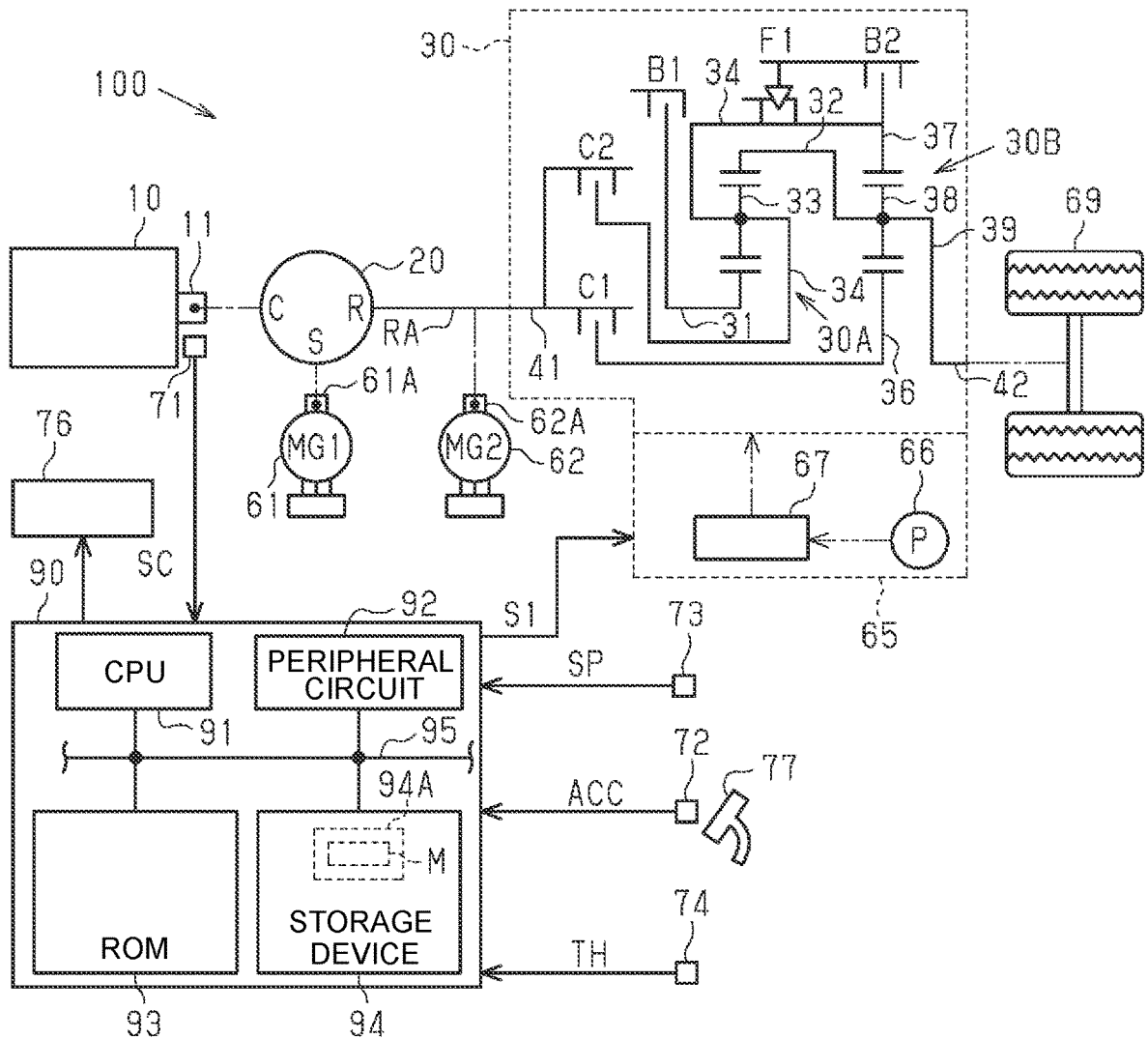
FIG. 1 is a schematic configuration diagram of a vehicle.
FIG. 2 is a table showing the relationship between gears and engagement elements in an automatic transmission.

An embodiment of the present disclosure will be described with reference to FIGS. 1 to 4. First, the general configuration of a vehicle 100 will be described. As shown in FIG. 1, the vehicle 100 includes an internal combustion engine 10, a power split device 20, an automatic transmission 30, drive wheels 69, a hydraulic device 65, a first motor generator 61, and a second motor generator 62.

The power split device 20 is coupled to a crankshaft 11 that is an output shaft of the internal combustion engine 10. The power split device 20 is a planetary gear mechanism having a sun gear S, a ring gear R, and a carrier C. The crankshaft 11 is coupled to the carrier C of the power split device 20. A rotating shaft 61A of the first motor generator 61 is coupled to the sun gear S. A rotating shaft 62A of the second motor generator 62 is coupled to a ring gear shaft RA that is an output shaft of the ring gear R. An input shaft 41 of the automatic transmission 30 is also coupled to the ring gear shaft RA. The right and left drive wheels 69 are coupled to an output shaft 42 of the automatic transmission 30 via a differential gear, not shown.

When the internal combustion engine 10 is driven and torque is applied from the crankshaft 11 to the carrier C of the power split device 20, the torque is split between the sun gear S side and the ring gear R side. When the first motor generator 61 operates as a motor and torque is applied to the sun gear S of the power split device 20, the torque is split between the carrier C side and the ring gear R side.

When the second motor generator 62 operates as a motor and torque is applied to the ring gear shaft RA, the torque is transmitted to the automatic transmission 30. When torque from the drive wheel 69 side is applied to the second motor generator 62 via the ring gear shaft RA, the second motor generator 62 functions as a generator and generates a regenerative braking force on the vehicle 100.

The automatic transmission 30 includes a first planetary gear mechanism 30A, a second planetary gear mechanism 30B, a first clutch C1, a second clutch C2, a first brake mechanism B1, a second brake mechanism B2, and a one-way clutch F1.

The first planetary gear mechanism 30A includes a sun gear 31, a ring gear 32, a pinion gear 33, and a carrier 34. The ring gear 32 is coupled to the sun gear 31 via the pinion gear 33. The pinion gear 33 is supported by the carrier 34.

The sun gear 31 is coupled to the first brake mechanism B1. The first brake mechanism B1 can switch between an engaged state and a disengaged state according to the pressure of oil supplied to the first brake mechanism B1. Specifically, as the pressure of the oil supplied to the first brake mechanism B1 increases, the first brake mechanism B1 is switched from the disengaged state to the engaged state. Rotation of the sun gear 31 is slowed or stopped when the first brake mechanism B1 is in the engaged state.

The one-way clutch F1 is coupled to the carrier 34. The one-way clutch F1 restricts rotation of the carrier 34 in one direction while allowing rotation of the carrier 34 in the other direction. That is, the one-way clutch F1 switches between a restricting state in which the one-way clutch F1 restricts rotation of the carrier 34 and an allowing state in which the one-way clutch F1 allows rotation of the carrier 34. The carrier 34 is coupled to the second brake mechanism B2. Like the first brake mechanism B1, the second brake mechanism B2 can switch between an engaged state and a disengaged state according to the pressure of oil supplied to the second brake mechanism B2. When the second brake mechanism B2 is in the engaged state, rotation of the carrier 34 is slowed or stopped.

The second planetary gear mechanism 30B includes a sun gear 36, a ring gear 37, a pinion gear 38, and a carrier 39. The ring gear 37 is coupled to the sun gear 36 via the pinion gear 38. The pinion gear 38 is supported by the carrier 39. The output shaft 42 is coupled to the carrier 39.

In each planetary gear mechanism configured as described above, the carrier 34 of the first planetary gear mechanism 30A is coupled to the ring gear 37 of the second planetary gear mechanism 30B. The ring gear 32 of the first planetary gear mechanism 30A is coupled to the carrier 39 of the second planetary gear mechanism 30B.

The sun gear 36 of the second planetary gear mechanism 30B is coupled to the input shaft 41 via the first clutch C1. The first clutch C1 can switch between an engaged state and a disengaged state according to the pressure of oil supplied to the first clutch C1. Specifically, as the pressure of the oil supplied to the first clutch C1 increases, the first clutch C1 is switched from the disengaged state to the engaged state. When the first clutch C1 is in the engaged state, the sun gear 36 of the second planetary gear mechanism 30B rotates with the input shaft 41.

The carrier 34 of the first planetary gear mechanism 30A is couple to the input shaft 41 via the second clutch C2. Like the first clutch C1, the second clutch C2 can switch between an engaged state and a disengaged state according to the pressure of oil supplied to the second clutch C2. When the second clutch C2 is in the engaged state, the carrier 34 of the first planetary gear mechanism 30A rotates with the input shaft 41. In the present embodiment, each of the first clutch C1, the second clutch C2, the first brake mechanism B1, and the second brake mechanism B2 is an engagement element.

As shown in FIG. 2, the gear of the automatic transmission 30 is shifted according to the combination of the engaged and disengaged states of the first clutch C1, the second clutch C2, the first brake mechanism B1, and the second brake mechanism B2 and the restricting or allowing state of the one-way clutch F1. The automatic transmission 30 can attain a total of five gears, namely four forward gears "1st" to "4th" and one reverse gear "R."

In FIG. 2, "○" indicates that the engagement element such as the first clutch C1 is in the engaged state and that the one-way clutch F1 is in the restricting state, and "(○)" indicates that the second brake mechanism B2 is in the engaged state or the disengaged state. A blank indicates that the engagement element such as the first clutch C1 is in the disengaged state and that the one-way clutch F1 is in the allowing state. For example, when the automatic transmission 30 is in second gear, the first clutch C1 and the first brake mechanism B1 are in the engaged state, while the second clutch C2 and the second brake mechanism B2 are in the disengaged state and the one-way clutch F1 is in the allowing state.

As shown in FIG. 1, the vehicle 100 is equipped with the hydraulic device 65. The hydraulic device 65 includes an oil pump 66 and a hydraulic circuit 67 through which oil from the oil pump 66 flows. The oil pump 66 is what is called a mechanical oil pump that operates by torque received from the crankshaft 11. The hydraulic circuit 67 includes a plurality of solenoid valves, not shown. The hydraulic circuit 67 adjusts the pressures of oil supplied to the first clutch C1, the second clutch C2, the first brake mechanism B1, and the second brake mechanism B2 by controlling the solenoid valves.

That is, in the present embodiment, the engagement elements such as the first clutch C1 are controlled to the engaged state or the disengaged state by the oil pressures by controlling the solenoid valves of the hydraulic circuit 67.

Figure 3:
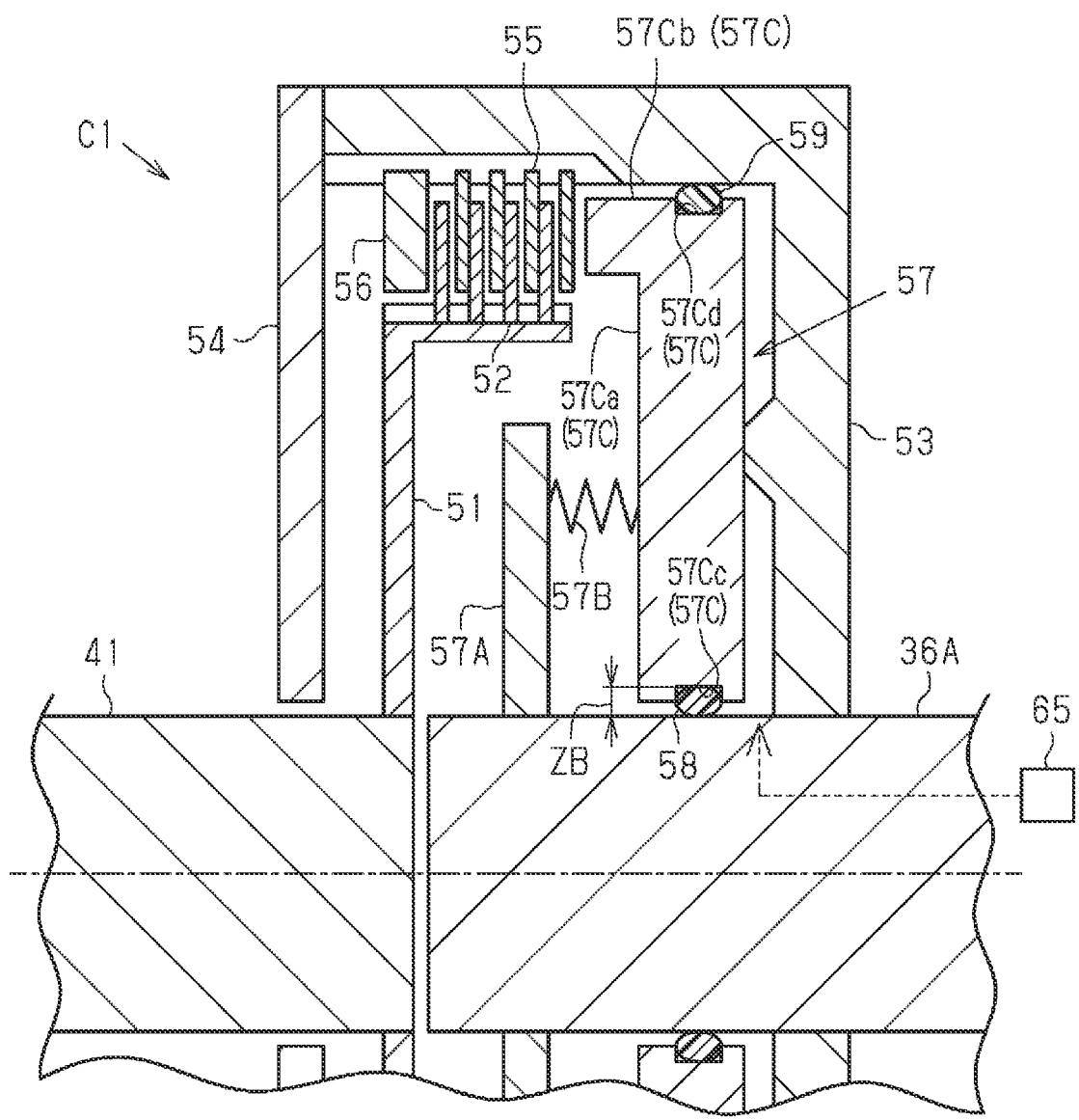
FIG. 3 is a partial sectional view of a first clutch.

Next, a specific configuration of the engagement element will be described. The first clutch C1 will be herein described as an example. As shown in FIG. 3, the first clutch C1 includes a hub 51, a plurality of first friction plates 52, a drum 53, a lid 54, a plurality of second friction plates 55, an end plate 56, a piston mechanism 57, and an inner peripheral seal member 58, and an outer peripheral seal member 59.

The input shaft 41 of the automatic transmission 30 is coupled to the sun gear 36 via a connecting shaft 36A. The connecting shaft 36A is fixed to the sun gear 36 and rotates with the sun gear 36. The connecting shaft 36A is disposed coaxially with the input shaft 41.

The hub 51 is fixed to the end on the connecting shaft 36A side of the input shaft 41. The hub 51 has a bottomed cylindrical overall shape. An opening of the hub 51 faces toward the connecting shaft 36A. The first friction plates 52 generally in the shape of an annular plate are attached to the outer peripheral surface of the hub 51. The first friction plates 52 extend radially outward from the outer peripheral surface of the hub 51. The first friction plates 52 are movable in the axial direction with respect to the hub 51. The first friction plates 52 are arranged at intervals in the axial direction. In FIG. 3, only one of the first friction plates 52 is denoted by a sign.

The drum 53 having a bottomed cylindrical overall shape is fixed to the connecting shaft 36A. The connecting shaft 36A extends through the bottom of the drum 53. An opening of the drum 53 faces toward the input shaft 41. The hub 51 and the first friction plates 52 are housed inside the drum 53. The lid 54 is attached to the opening edge of the drum 53 so as to cover the hub 51 and the first friction plates 52 housed in the drum 53.

The second friction plates 55 generally in the shape of an annular plate are attached to the inner peripheral surface of the drum 53. The second friction plates 55 extend radially inward from the inner peripheral surface of the drum 53. The second friction plates 55 are movable in the axial direction with respect to the drum 53. The second friction plates 55 are arranged at intervals in the axial direction. The first friction plates 52 and the second friction plates 55 are alternately arranged. In FIG. 3, only one of the second friction plates 55 is denoted by a sign.

The end plate 56 generally in the shape of an annular plate is fixed to the inner peripheral surface of the drum 53. The end plate 56 is disposed closer to the lid 54 than the first friction plates 52 and the second friction plates 55 are. The end plate 56 is immovably fixed to the drum 53.

The piston mechanism 57 that is driven by the pressure of supplied oil is housed inside the drum 53. The piston mechanism 57 is disposed between the bottom of the drum 53 and the hub 51. The piston mechanism 57 includes a fixed portion 57A, a spring 57B, and a piston 57C. The fixed portion 57A is fixed to a portion of the connecting shaft 36A located between the bottom of the drum 53 and the hub 51 and away from the bottom of the drum 53. The fixed portion 57A is generally in the shape of an annular plate and extends radially outward from the outer peripheral surface of the connecting shaft 36A.

The piston 57C is disposed between the fixed portion 57A and the bottom of the drum 53. The piston 57C is movable in the axial direction with respect to the connecting shaft 36A. The piston 57C includes a base 57Ca generally in the shape of an annular plate and a contact portion 57Cb protruding from the base 57Ca. The inside diameter of the base 57Ca is slightly larger than the outside diameter of the connecting shaft 36A. The base 57Ca is supported by the outer peripheral surface of the connecting shaft 36A via the inner peripheral seal member 58 that will be described later. That is, the base 57Ca of the piston 57C and the connecting shaft 36A are separated from each other.

The outside diameter of the base 57Ca is slightly smaller than the inside diameter of the drum 53. The base 57Ca is supported by the inner peripheral surface of the drum 53 via the outer peripheral seal member 59 that will be described later. That is, the base 57Ca of the piston 57C and the inner peripheral surface of the drum 53 are separated from each other. The contact portion 57Cb protrudes from the radial outer end of the base 57Ca toward the opening of the drum 53. The contact portion 57Cb faces the first friction plates 52 and the second friction plates 55 in the axial direction.

The spring 57B is interposed between the piston 57C and the fixed portion 57A. The spring 57B biases the piston 57C in the direction from the fixed portion 57A toward the bottom of the drum 53. A plurality of the springs 57B is arranged at intervals in the circumferential direction.

The base 57Ca has an inner peripheral groove 57Cc in its inner peripheral surface. The inner peripheral groove 57Cc extends outward in the radial direction. The inner peripheral groove 57Cc extends along the entire inner circumference of the base 57Ca and has an annular overall shape. The inner peripheral seal member 58 having a generally annular shape is fitted in the inner peripheral groove 57Cc. The inner peripheral seal member 58 is disposed in a compressed state in the clearance between the bottom of the inner peripheral groove 57Cc and the outer peripheral surface of the connecting shaft 36A.

As used herein, an uncompressed dimension ZA refers to the dimension of a part of the uncompressed inner peripheral seal member 58 that is to be located in the clearance between the bottom of the inner peripheral groove 57Cc and the outer peripheral surface of the connecting shaft 36A. That is, in the present embodiment, the uncompressed dimension ZA is the difference between the inside and outside diameters of the inner peripheral seal member 58 having a generally annular shape. The uncompressed dimension ZA is larger than a clearance dimension ZB. The clearance dimension ZB is the dimension of the clearance between the bottom of the inner peripheral groove 57Cc and the outer peripheral surface of the connecting shaft 36A. The inner peripheral seal member 58 is an example of the seal member. For the inner peripheral seal member 58, the piston 57C is the first component and the connecting shaft 36A is the second component.

The base 57Ca has an outer peripheral groove 57Cd in its outer peripheral surface. The outer peripheral groove 57Cd extends inward in the radial direction. The outer peripheral groove 57Cd extends along the entire outer circumference of the base 57Ca and has an annular overall shape. The outer peripheral seal member 59 having a generally annular shape is fitted in the outer peripheral groove 57Cd. The outer peripheral seal member 59 is disposed in a compressed state in the clearance between the bottom of the outer peripheral groove 57Cd and the inner peripheral surface of the drum 53.

In the first clutch C1, when oil is supplied from the hydraulic device 65 into the clearance between the piston 57C and the bottom of the drum 53, the piston 57C is moved toward the opening of the drum 53, namely to the left in FIG. 3, against the biasing force of the springs 57B. The first friction plates 52 and the second friction plates 55 are thus sandwiched between the contact portion 57Cb of the piston 57C and the end plate 56 and are frictionally engaged with each other. As a result, the first clutch C1 is switched from the disengaged state to the engaged state.

On the other hand, in the first clutch C1, when oil is not supplied from the hydraulic device 65 into the clearance between the piston 57C and the bottom of the drum 53, the piston 57C is moved toward the bottom of the drum 53, namely to the right in FIG. 3, by the biasing force of the springs 57B. The first friction plates 52 and the second friction plates 55 are thus no longer frictionally engaged with each other. As a result, the first clutch C1 is switched from the engaged state to the disengaged state.

The inner peripheral seal member 58 moves with the piston 57C when the first clutch C1 is switched between the disengaged state and the engaged state as described above. Accordingly, the inner peripheral seal member 58 slides along the outer peripheral surface of the connecting shaft 36A when the piston 57C moves relative to the connecting shaft 36A. The outer peripheral seal member 59 also moves with the piston 57C when the first clutch C1 is switched between the disengaged state and the engaged state.

Accordingly, the outer peripheral seal member 59 slides along the inner peripheral surface of the drum 53 when the piston 57C moves relative to the drum 53. Since the second clutch C2 has a configuration similar to the first clutch C1, description of the specific configuration of the second clutch C2 will be omitted.

As shown in FIG. 1, the vehicle 100 is equipped with a crank angle sensor 71, an accelerator position sensor 72, a vehicle speed sensor 73, a temperature sensor 74, a display 76, and an accelerator pedal 77. The crank angle sensor 71 detects a crank angle SC. The crank angle SC is the rotation angle of the crankshaft 11. The accelerator position sensor 72 detects an accelerator operation amount ACC. The accelerator operation amount ACC is the operation amount of the accelerator pedal 77 that is operated by a driver. The vehicle speed sensor 73 detects a vehicle speed SP. The vehicle speed SP is the speed of the vehicle 100. The temperature sensor 74 detects an oil temperature TH. The oil temperature TH is the temperature of oil flowing from the oil pump 66 to the hydraulic circuit 67. In the present embodiment, the temperature sensor 74 is attached to an oil passage between the oil pump 66 and the hydraulic circuit 67. The display 76 displays visual information to the driver of the vehicle 100 etc. An example of the display 76 is an indicator lamp.

The vehicle 100 includes a control device 90. A signal indicating the crank angle SC is input from the crank angle sensor 71 to the control device 90. A signal indicating the accelerator operation amount ACC is input from the accelerator position sensor 72 to the control device 90. A signal indicating the vehicle speed SP is input from the vehicle speed sensor 73 to the control device 90. A signal indicating the oil temperature TH is input from the temperature sensor 74 to the control device 90. The control device 90 calculates an engine rotational speed NE based on the crank angle SC.

The engine rotational speed NE is the rotational speed of the crankshaft 11 per unit time.

The control device 90 also calculates a period during which the oil temperature TH is within a predetermined temperature range, based on the oil temperature TH. The temperature range is set as a temperature range from the lower limit to the upper limit of the oil temperature TH and is divided into a plurality of temperature ranges. That is, a plurality of temperature ranges is determined in advance in predetermined increments. For example, when the possible range of the oil temperature TH is 0° C. to 200° C. and the predetermined increment is 10° C., the temperature ranges are a total of 20 temperature ranges from a first temperature range to a 20th temperature range. As a specific example, when the control device 90 acquires the oil temperature TH for a total of 100 hours and a period during which the oil temperature TH is within the first temperature range is one hour, a first temperature period T1, which is the period during which the oil temperature TH is within the first temperature range, is one hour. Similarly, for example, when a period during which the oil temperature TH is within the second temperature range is three hours, a second temperature period T2, which is the period during which the oil temperature TH is within the second temperature range, is three hours. For example, when a period during which the oil temperature TH is within the 20th temperature range is one hour, a 20th temperature period T20, which is the period during which the oil temperature TH is within the 20th temperature range, is one hour.

As described above, the oil temperature TH is the temperature of oil flowing from the oil pump 66 to the hydraulic circuit 67. Oil having the oil temperature TH is therefore supplied to the engagement element, and the inner peripheral seal member 58 and the outer peripheral seal member 59 are exposed to the oil having the oil temperature TH. Accordingly, the first temperature period T1 is a period during which the inner peripheral seal member 58 has been exposed to oil having a temperature within the first temperature range. Similarly, the second temperature period T2 is a period during which the inner peripheral seal member 58 has been exposed to oil having a temperature within the second temperature range.

The control device 90 includes a central processing unit (CPU) 91, a peripheral circuit 92, a read-only memory (ROM) 93, and a storage device 94. The CPU 91, the peripheral circuit 92, the ROM 93, and the storage device 94 are connected by a bus 95 so that the CPU 91, the peripheral circuit 92, the ROM 93, and the storage device 94 can communicate with each other. Various programs are stored in advance in the ROM 93 in order for the CPU 91 to perform various controls. Mapping data 94A is stored in advance in the storage device 94. A map M defined by the mapping data 94A outputs an output variable indicating the degree of degradation of the inner peripheral seal member 58 when an input variable is input. The map M will be specifically described later. The storage device 94 stores data input to the control device 90, including the accelerator operation amount ACC, the vehicle speeds SP, and the engine rotational speed NE, over a certain period of time. The storage device 94 also stores a total of 20 periods from the first temperature period T1 to the 20th temperature period T20. The peripheral circuit 92 includes a circuit that generates clock signals defining an internal operation, a power supply circuit, a reset circuit, etc. In the present embodiment, the CPU 91 and the ROM 93 are the execution device. The storage device 94 is the storage device. The control device 90 functions as the degradation estimation device that estimates the degree of degradation of the inner peripheral seal member 58.

The CPU 91 controls the internal combustion engine 10, the first motor generator 61, the second motor generator 62, the automatic transmission 30, etc. by executing the various programs stored in the ROM 93. Specifically, the CPU 91 calculates a requested vehicle output, which is a requested value of an output that is necessary for the vehicle 100 to move, based on the accelerator operation amount ACC and the vehicle speed SP. The CPU 91 determines torque distribution among the internal combustion engine 10, the first motor generator 61, and the second motor generator 62 based on the requested vehicle output. The CPU 91 controls the output of the internal combustion engine 10 and the power running and regeneration of the first motor generator 61 and the second motor generator 62, based on the torque distribution among the internal combustion engine 10, the first motor generator 61, and the second motor generator 62.

The CPU 91 calculates a desired gear, namely a gear to which the automatic transmission 30 is desired to be shifted, based on the vehicle speed SP and the requested vehicle output. The CPU 91 calculates desired pressures, namely desired values of the pressure of oil supplied to the first clutch C1, the second clutch C2, the first brake mechanism B1, and the second brake mechanism B2, based on the desired gear. The CPU 91 then outputs a control signal 51 to the hydraulic device 65 based on the desired pressures. The hydraulic device 65 changes the pressures of oil supplied to the first clutch C1, the second clutch C2, the first brake mechanism B1, and the second brake mechanism B2, based on the control signal 51. For example, as shown in FIG. 2, when the automatic transmission 30 is in second gear before shifting, the first clutch C1 and the first brake mechanism B1 are in the engaged state, while the second clutch C2 and the second brake mechanism B2 are in the disengaged state and the one-way clutch F1 is in the allowing state. When the desired gear of the automatic transmission 30 is set to third gear, the pressure of oil supplied from the hydraulic device 65 to the second clutch C2 gradually increases in response to the control signal 51 output based on the desired pressure for the second clutch C2. As a result, the second clutch C2 is switched from the disengaged state to the engaged state. On the other hand, the pressure of oil supplied from the hydraulic device 65 to the first brake mechanism B1 gradually decreases in response to the control signal Si output based on the desired pressure for the first brake mechanism B1. As a result, the first brake mechanism B1 is switched from the engaged state to the disengaged state. The automatic transmission 30 is thus shifted from second gear to third gear.

Next, estimation control in which the CPU 91 estimates the degree of degradation of the inner peripheral seal member 58 will be described. The CPU 91 performs the estimation control for the inner peripheral seal member 58 in the first clutch C1 once every time the first clutch C1 is switched from the disengaged state to the engaged state in the shifting of the automatic transmission 30. The CPU 91 performs the estimation control for the inner peripheral seal member 58 in the second clutch C2 once every time the second clutch C2 is switched from the disengaged state to the engaged state in the shifting of the automatic transmission 30. An estimation program, which is a program for executing the estimation control, is stored in advance in the ROM 93. The CPU 91 performs the estimation control by executing the estimation program stored in the ROM 93.

Figure 4:
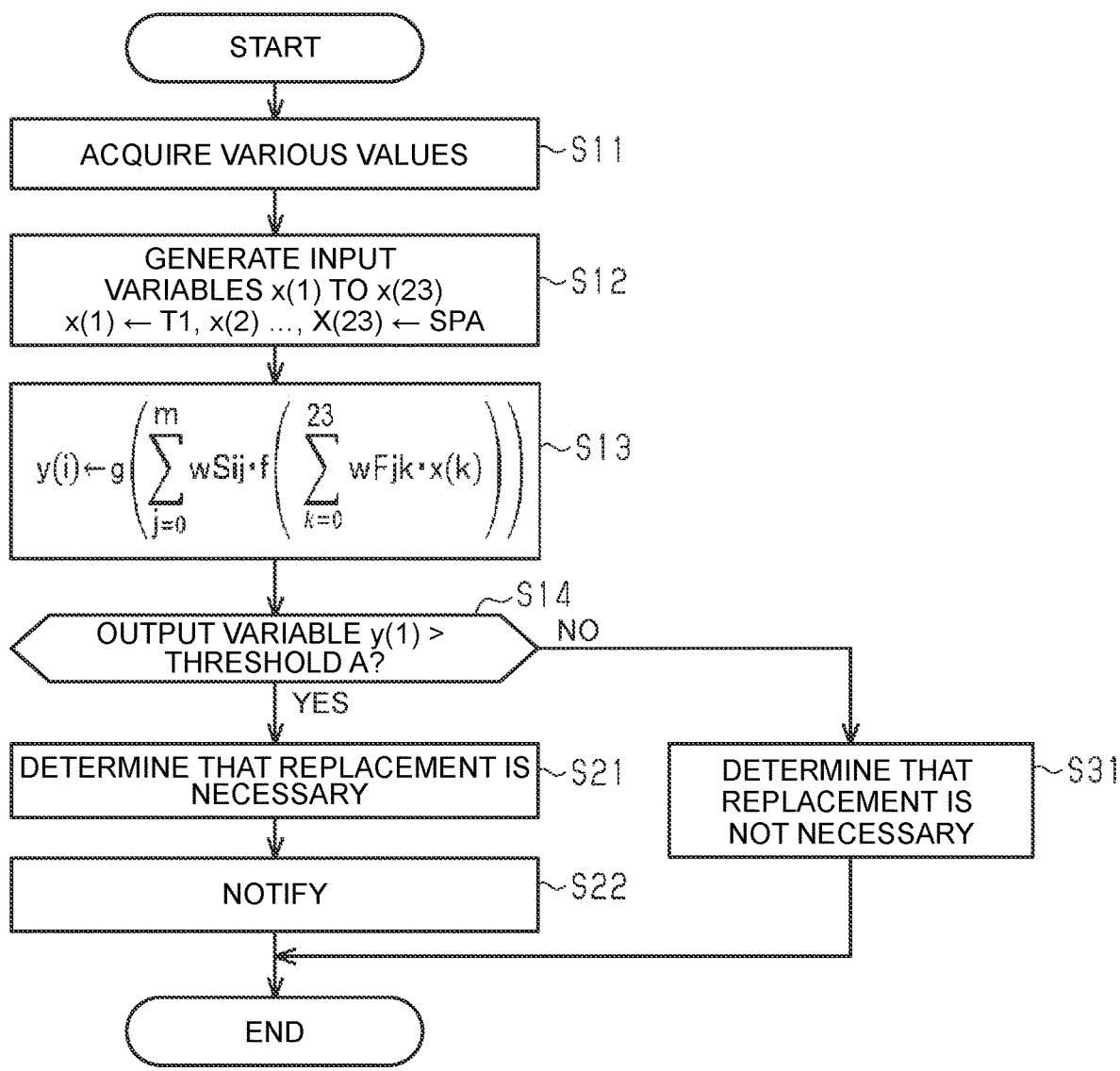
FIG. 4 is a flowchart of estimation control.

As shown in FIG. 4, when the CPU 91 starts the estimation control, the CPU 91 acquires various values by accessing the storage device 94 in step S11. Specifically, the CPU 91 acquires the total of 20 periods from the first temperature period T1 to the 20th temperature period T20.

The CPU 91 acquires the number of engagements EN, namely the number of times the engagement element that is switched from the disengaged state to the engaged state has been engaged in the shifting of the automatic transmission 30 finished immediately before the estimation control. As used herein, the number of engagements EN is the number of times the engagement element has been engaged during the period from when the automatic transmission 30 was mounted on the vehicle 100 during manufacturing of the vehicle 100 until step S11 is performed. The number of engagements EN of each engagement element is stored in the storage device 94. For example, when the inner peripheral seal member 58 of a certain engagement element is replaced for maintenance of the automatic transmission 30 etc., the number of engagements EN of that engagement element is reset.

The CPU 91 calculates a corrected number of engagements CVN by multiplying the number of engagements EN by a sliding correction value CVA. A predetermined sliding correction value CVA is stored in the storage device 94. The sliding correction value CVA is defined as follows. The sliding resistance of the inner peripheral seal member 58 along the outer peripheral surface of the connecting shaft 36A may vary from a design value of the sliding resistance due to manufacturing variation of the connecting shaft 36A and the inner peripheral seal member 58. A force that acts on the inner peripheral seal member 58 when the engagement element operates varies depending on the magnitude of the sliding resistance. Accordingly, even when the number of engagements EN is the same, the degree of degradation of the inner peripheral seal member 58 varies depending on the magnitude of the sliding resistance. The sliding correction value CVA is therefore determined as a value for correcting the deviation between the actual sliding resistance and the design value of the sliding resistance. When the actual sliding resistance is smaller than the design value of the sliding resistance, the sliding correction value CVA is smaller than "1." On the other hand, when the actual sliding resistance is larger than the design value of the sliding resistance, the sliding correction value CVA is larger than "1." As an example of the operation of setting the sliding correction value CVA, the actual sliding resistance is measured for a certain engagement element in each of automatic transmissions 30 manufactured in the same lot, and the sliding correction value CVA is set by comparing the average value of the measured sliding resistances with the design value of the sliding resistance.

The CPU 91 acquires a compression dimension Z of the inner peripheral seal member 58. Specifically, for acquisition of the compression dimension Z, the actual uncompressed dimension ZA is measured in advance in consideration of the deviation between the actual uncompressed dimension ZA and a design value of the uncompressed dimension ZA due to manufacturing variation etc. The actual clearance dimension ZB is also measured in advance in consideration of the deviation between the actual clearance dimension ZB and a design value of the clearance dimension ZB due to manufacturing variation etc. The compression dimension Z of the inner peripheral seal member 58, which is the actual uncompressed dimension ZA minus the actual clearance dimension ZB, namely the difference between the uncompressed dimension ZA and the clearance dimension ZB, is stored in advance in the storage device 94. The CPU 91 acquires the compression dimension Z of the inner peripheral seal member 58 by accessing the storage device 94. As an example of the operation of storing the uncompressed dimension ZA, the dimension of a part of the inner peripheral seal member 58 that is to be located in the clearance between the bottom of the inner peripheral groove 57Cc and the outer peripheral surface of the connecting shaft 36A is measured in an uncompressed state for a certain engagement element in each of automatic transmissions 30 manufactured in the same lot. The average value of the measured dimensions is stored as the uncompressed dimension ZA in the storage device 94. The clearance dimension ZB is also stored in the storage device 94 in a manner similar to that of the uncompressed dimension ZA.

The CPU 91 acquires an average vehicle speed SPA. The average vehicle speed SPA is the average value of the vehicle speeds SP. Specifically, the CPU 91 acquires the vehicle speeds SP for the period from when the automatic transmission 30 was mounted on the vehicle 100 during manufacturing of the vehicle 100 until step S11 is performed. The CPU 91 calculates the average vehicle speed SPA based on the acquired vehicle speeds SP. In the present embodiment, step S11 is the acquisition process. The routine then proceeds to step S12.

In step S12, the CPU 91 generates the various values acquired in step S11 as input variables x(1) to x(23) for the map M for estimating the degree of degradation of the inner peripheral seal member 58.

The CPU 91 substitutes the first temperature period T1 to the 20th temperature period T20 for the input variables x(1) to x(20). Specifically, the CPU 91 substitutes the first temperature period T1 for the input variable x(1), substitutes the second temperature period T2 for the input variable x(2), and substitutes the 20th temperature period T20 for the input variable x(20).

The CPU 91 substitutes the corrected number of engagements CVN for the input variable x(21), substitutes the compression dimension Z for the input variable x(22), and substitutes the average vehicle speed SPA for the input variable x(23). The routine then proceeds to step S13.

In the present embodiment, the input variable x(1) is a first thermal history variable that is a variable indicating the period during which the seal member has been exposed to temperatures within a predetermined first temperature range. The input variable x(2) is a second thermal history variable that is a variable indicating the period during which the seal member has been exposed to temperatures within a predetermined second temperature range. The input variable x(21) is a load history variable that is a variable indicating the number of times a load has acted on the seal member. The input variable x(22) is a compression variable that is a variable indicating the difference between the uncompressed dimension of a part of the seal member that is to be located in the clearance and the dimension of the clearance.

In step S13, the CPU 91 calculates the value of an output variable y(i) by inputting the input variables x(1) to x(23) generated in step S12 and an input variable x(0) that is a bias parameter to the map M defined by the mapping data 94A stored in advance in the storage device 94. The routine then proceeds to step S14.

An example of the map M defined by the mapping data 94A is a function approximator and is a fully connected feedforward neural network with one intermediate layer. Specifically, in the map M defined by the mapping data 94A, the values of the nodes of the intermediate layer are determined when each of "m" values obtained by transforming the input variables x(1) to x(23) and the input variable x(0) that is a bias parameter by a linear map defined by a coefficient wFjk (j=1 to m, k=0 to 23) is substituted for an activation function f. The output variable y(1) is determined when each of values obtained by transforming the values of the nodes of the intermediate layer by a linear map defined by a coefficient wSij (i=1) is substituted for an activation function g. The output variable y(1) is a variable indicating the hardness of the inner peripheral seal member 58. The larger the output variable y(1), the higher the hardness of the inner peripheral seal member 58. In the present embodiment, steps S12 and S13 are the calculation process. In the present embodiment, an example of the activation function f is a ReLU function, and an example of the activation function g is a sigmoid function.

For example, the map M defined by the mapping data 94A is generated as follows. First, before shipping of the vehicle 100 from a factory, prototype vehicles equipped with the automatic transmission 30 are caused to travel in various conditions to degrade the inner peripheral seal member 58, and various values regarding the inner peripheral seal member 58 and the values of the hardness of the inner peripheral seal member 58 are acquired. Next, a learned map M is generated using the various values regarding the inner peripheral seal member 58 and the values of the hardness of the inner peripheral seal member 58 as teacher data.

In step S14, the CPU 91 determines whether the output variable y(1) is larger than a predetermined threshold A. The hardness of the inner peripheral seal member 58 tends to increase as the inner peripheral seal member 58 degrades.

Accordingly, the threshold A is set as a value for determining whether the hardness of the inner peripheral seal member 58 is within a predetermined specified range. When the CPU 91 determines in step S14 that the output variable y(1) is larger than the threshold A (S14: YES), the routine proceeds to step S21.

In step S21, the CPU 91 determines that the inner peripheral seal member 58 needs to be replaced with a new inner peripheral seal member 58. The routine then proceeds to step S22. In step S22, the CPU 91 outputs to the display 76 a signal for causing the display 76 to display that the inner peripheral seal member 58 needs to be replaced with a new inner peripheral seal member 58. The CPU 91 then ends the current estimation control.

On the other hand, when the CPU 91 determines in step S14 that the output variable y(1) is equal to or smaller than the threshold A (S14: NO), the routine proceeds to step S31. In step S31, the CPU 91 determines that it is not necessary to replace the inner peripheral seal member 58 with a new inner peripheral seal member 58. The CPU 91 then ends the current estimation control.

Functions and effects of the present embodiment will be described.

(1) For example, when the first clutch C1 is switched from the disengaged state to the engaged state or from the engaged state to the disengaged state during shifting of the automatic transmission 30, a load acts on the inner peripheral seal member 58 in the first clutch C1 due to the operation of the first clutch C1. As a specific example, when the piston 57C moves relative to the connecting shaft 36A, the inner peripheral seal member 58 slides along the outer peripheral surface of the connecting shaft 36A, and a load due to this sliding motion acts on the inner peripheral seal member 58. The oil pressure applied to the inner peripheral seal member 58 changes as the pressure of oil supplied between the piston 57C and the bottom of the drum 53 changes. Accordingly, a load due to this change in oil pressure acts on the inner peripheral seal member 58. As a result, degradation of the inner peripheral seal member 58 progresses every time a load acts on the inner peripheral seal member 58.

In the present embodiment, the map M defined by the mapping data 94A outputs an output variable indicating the degree of degradation of the inner peripheral seal member 58 in consideration of not only the first temperature period T1 etc. but also the load history variable that is a variable indicating the number of times a load has acted on the inner peripheral seal member 58. Accordingly, for example, even when the number of times a load has acted on the inner peripheral seal member 58 increases with the number of times the first clutch C1 has been operated, and degradation of the inner peripheral seal member 58 has progressed accordingly, the map M can output an output variable reflecting the number of times a load has acted on the inner peripheral seal member 58. As a result, an output variable more accurately reflecting degradation of the inner peripheral seal member 58 can be obtained as compared to the configuration in which the number of times a load has acted on the inner peripheral seal member 58 is not considered.

(2) The way in which degradation of the inner peripheral seal member 58 progresses changes significantly depending on the temperature of oil to which the inner peripheral seal member 58 is exposed. Accordingly, there is a limit to improvement in estimation accuracy if the period is not divided by temperature range of oil to which the inner peripheral seal member 58 is exposed and the degree of degradation of the inner peripheral seal member 58 is estimated based only on the period during which the inner peripheral seal member 58 has been exposed to oil within one temperature range.

In the present embodiment, the temperature range is divided into a total of 20 temperature ranges from the first temperature range to the 20th temperature range, and a plurality of periods from the first temperature period T1 to the 20th temperature period T20 during which the inner peripheral seal member 58 has been exposed to oil within each temperature range is calculated. A variable indicating the periods from the first temperature period T1 to the 20th temperature period T20 is input as the thermal history variable to the map M defined by the mapping data 94A. Accordingly, even when the way in which degradation of the inner peripheral seal member 58 degrades changes due to a change in temperature of oil to which the inner peripheral seal member 58 is exposed, the probability that a value accurately reflecting degradation of the inner peripheral seal member 58 may be obtained as an output variable is increased.

(3) Degradation of the inner peripheral seal member 58 in the first clutch C1 tends to progress as the number of engagements EN of the first clutch C1 increases. However, even when the number of engagements EN is the same, the degree of degradation of the inner peripheral seal member 58 varies depending on the sliding resistance of the inner peripheral seal member 58 along the outer peripheral surface of the connecting shaft 36A.

A variable indicating the corrected number of engagements CVN, namely the number of engagements EN corrected in consideration of the sliding resistance of the inner peripheral seal member 58 along the outer peripheral surface of the connecting shaft 36A, is input as a load history variable to the map M defined by the mapping data 94A of the present embodiment. That is, a load history variable reflecting the sliding resistance that may affect the degree of degradation of the inner peripheral seal member 58 can be input to the map M. Accordingly, even when the sliding resistance of the inner peripheral seal member 58 along the outer peripheral surface of the connecting shaft 36A varies, a value accurately reflecting degradation of the inner peripheral seal member 58 can be obtained as an output variable.

(4) In the vehicle 100, the higher the vehicle speed SP, the more the automatic transmission 30 tends to shift to higher gear. When the vehicle speed SP continues to be high, the automatic transmission 30 tends to shift to higher gear more frequently than to lower gear. Accordingly, there is a certain degree of correlation between the average vehicle speed SPA and the frequency with which the automatic transmission 30 of the vehicle 100 shifts to each gear. When the frequency with which the automatic transmission 30 shifts to a certain gear is known, it is possible to estimate which engagement element has been switched to the engaged state or the disengaged state with what frequency in order to attain that gear.

A variable indicating the average vehicle speed SPA is input as an input variable to the map M defined by the mapping data 94A of the present embodiment. Accordingly, for example, when estimating the degree of degradation of the inner peripheral seal member 58 in a certain engagement element, the estimated degree of degradation of the inner peripheral seal member 58 reflects the frequency with which this engagement element has been switched to the engaged state or the disengage state.

(5) The actual uncompressed dimension ZA may deviate from its design value or the actual clearance dimension ZB may deviate from its design value due to, e.g., manufacturing variation of the inner peripheral seal member 58, the piston 57C, etc.

Since the inner peripheral seal member 58 is disposed in a compressed state in the clearance between the bottom of the inner peripheral groove 57Cc and the outer peripheral surface of the connecting shaft 36A, a load acting on the inner peripheral seal member 58 may vary depending on the compression state of the inner peripheral seal member 58. For example, the smaller the clearance dimension ZB is than the uncompressed dimension ZA, the more strongly the inner peripheral seal member 58 is compressed between the bottom of the inner peripheral groove 57Cc and the outer peripheral surface of the connecting shaft 36A, and the larger the load acting on the inner peripheral seal member 58 tends to be.

A variable indicating the compression dimension Z of the inner peripheral seal member 58 that is the difference between the uncompressed dimension ZA and the clearance dimension ZB is input as an input variable to the map M defined by the mapping data 94A of the present embodiment. Accordingly, an output variable can be obtained in consideration of the compression dimension Z indicating how much the inner peripheral seal member 58 is compressed. As a result, even when the uncompressed dimension ZA and the clearance dimension ZB vary due to, e.g., manufacturing variation etc., an accurate degree of degradation of the inner peripheral seal member 58 can be obtained.

(6) The map M defined by the mapping data 94A outputs a variable indicating the hardness of the inner peripheral seal member 58 as an output variable.

Accordingly, it is easy to objectively know the degree of degradation of the inner peripheral seal member 58 by referring to the output variable of the map M.

Other Embodiments

The above embodiment can be modified as described below. In the above embodiment and the following modifications can be combined unless technically inconsistent.

About Thermal History Variable

In the above embodiment, the thermal history variable that is input to the map M is not limited to the example of the above embodiment. For example, the total of 20 temperature ranges from the first temperature range to the 20th temperature range need not necessarily be set as the temperature ranges, and the number of temperature ranges to be set can be changed. The number of temperature ranges need not necessarily be two or more. For example, only one temperature range that may affect degradation of the seal member may be set. In this case, only one thermal history variable is input to the map M.

Even when a plurality of temperature ranges is set, it is also possible to input only one thermal history variable to the map M while reflecting the period during which the inner peripheral seal member 58 has been exposed to temperatures within each temperature range. For example, it is herein assumed that a first temperature range and a second temperature range are set and that the inner peripheral seal member 58 degrades twice as fast in the second temperature range as in the first temperature range. In this case, the period during which the inner peripheral seal member 58 has been exposed to temperatures within the second temperature range is corrected by multiplying by a predetermined value, e.g., "2." The corrected period thus calculated is added to the period during which the inner peripheral seal member 58 has been exposed to temperatures within the first temperature range. The value thus calculated is input as a thermal history variable to the map M.

According to this modification, an increase in number of input variables to be input to the map M can be prevented while taking into consideration the fact that the inner peripheral seal member 58 has been exposed to temperatures within the second temperature range in which degradation of the inner peripheral seal member 58 more tends to progress. This restrains the mapping data from becoming complicated. The value for correcting the period may be calculated in advance by testing or simulating how degradation of the seal member progresses in each temperature range, or may be approximately determined by a rule of thumb regarding the rate of a chemical reaction such as the "10° C. rule" etc.

About Load History Variable

In the above embodiment, the load history variable that is input to the map M is not limited to the example of the above embodiment. For example, the load history variable that is input to the map M may be the number of engagements EN instead of the corrected number of engagements CVN.

The greater the distance traveled by the vehicle 100 since the automatic transmission 30 was mounted on the vehicle 100 during manufacturing of the vehicle 100, the larger the number of engagements EN tends to be. Accordingly, the load history variable that is input to the map M may be the distance traveled by the vehicle 100 since the inner peripheral seal member 58 was attached to the automatic transmission 30. According to this configuration, the traveled distance that has a high correlation with the degree of degradation of the inner peripheral seal member 58 and that is easy to detect in the vehicle 100 is input as an input variable. An output variable accurately reflecting degradation of the inner peripheral seal member 58 can thus be obtained without adding any new sensors etc. in order to implement the above technique.

The larger the number of times the automatic transmission 30 has shifted since the automatic transmission 30 was mounted on the vehicle 100 during manufacturing of the vehicle 100, the larger the number of engagements EN tends to be. Accordingly, the load history variable that is input to the map M may be the number of times the automatic transmission 30 has shifted since the inner peripheral seal member 58 was attached to the automatic transmission 30.

Not only when the engagement element is switched from the disengaged state to the engaged state, but also when the engagement element is switched from the engaged state to the disengaged state, degradation of the inner peripheral seal member 58 tends to progress due to the load acting on the inner peripheral seal member 58. Accordingly, the load history variable that is input to the map M may be the number of disengagements, namely the number of times the engagement element has been switched from the engaged state to the disengaged state, in addition to or instead of the number of engagements EN that is the number of times the engagement element has been switched from the disengaged state to the engaged state.

It is not necessary to use all of the corrected number of engagements CVN, the number of engagements EN, the distance traveled by the vehicle 100, the number of times the automatic transmission 30 has shifted, and the number of disengagements as the load history variables that are input to the map M. At least one of these values need only be used as the load history variable that is input to the map M.

About Other Input Variables

In the above embodiment, the input variable indicating how much the inner peripheral seal member 58 is compressed may be a variable other than the compression dimension Z. For example, the smaller the clearance dimension ZB is than the uncompressed dimension ZA, the more strongly the inner peripheral seal member 58 is compressed between the bottom of the inner peripheral groove 57Cc and the outer peripheral surface of the connecting shaft 36A, and the larger the load acting on the inner peripheral seal member 58 tends to be. Therefore, even when the uncompressed dimension ZA is the same, the smaller the clearance dimension ZB, the larger the load acting on the inner peripheral seal member 58 tends to be. Accordingly, the input variable that is input to the map M may be the clearance dimension ZB in addition to or instead of the compression dimension Z. According to this configuration, even when the clearance dimension ZB, which is the dimension of the clearance between the bottom of the inner peripheral groove 57Cc and the outer peripheral surface of the connecting shaft 36A, varies due to manufacturing variation etc., an output variable reflecting the variation in clearance dimension ZB can be obtained. An accurate degree of degradation of the inner peripheral seal member 58 can therefore be obtained in consideration of the clearance dimension ZB.

For example, even when the clearance dimension ZB is the same, the larger the uncompressed dimension ZA, the larger the load acting on the inner peripheral seal member 58 tends to be. Accordingly, the input variable that is input to the map M may be the clearance dimension ZB in addition to or instead of the compression dimension Z.

The load acting on the inner peripheral seal member 58 may be different even when the compression dimension Z, which is the difference between the uncompressed dimension ZA and the clearance dimension ZB, is the same. For example, the farther the ratio between the uncompressed dimension of the inner peripheral seal member 58 and the compressed dimension of the inner peripheral seal member 58 is from "1," the larger the load acting on the inner peripheral seal member 58 and therefore the faster the inner peripheral seal member 58 may degrade. Accordingly, the input variable that is input to the map M may be the uncompressed dimension ZA and the clearance dimension ZB corresponding to the compressed dimension of the inner peripheral seal member 58, or the ratio between the uncompressed dimension ZA and the clearance dimension ZB, in addition to or instead of the compression dimension Z.

Of the input variables that are input to the map M, the compression dimension Z, the average vehicle speed SPA, etc. are not essential and may be omitted as appropriate. That is, the input variables that are input to the map M need only include at least the thermal history variable and the load history variable.

About Output Variable

In the above embodiment, the output variable of the map M is not limited to the example of the above embodiment. For example, as degradation of the inner peripheral seal member 58 progresses, not only the hardness of the inner peripheral seal member 58 tends to increase, but also the tensile strength of the inner peripheral seal member 58 tends to decrease. Accordingly, the output variable of the map M maybe the tensile strength of the inner peripheral seal member 58 in addition to or instead of the hardness of the inner peripheral seal member 58. In this configuration, when the tensile strength of the inner peripheral seal member 58 is lower than a predetermined threshold of the tensile strength, it is determined that the inner peripheral seal member 58 needs to be replaced with a new inner peripheral seal member 58.

As degradation of the inner peripheral seal member 58 progresses, it tends to be difficult for the inner peripheral seal member 58 to stretch. Accordingly, the output variable of the map M may be a value indicating stretchability of the inner peripheral seal member 58 in addition to or instead of the hardness of the inner peripheral seal member 58.

Since the inner peripheral seal member 58 slides along the outer peripheral surface of the connecting shaft 36A, the inner peripheral seal member 58 tends to wear gradually. Accordingly, the output variable of the map M may be the amount of wear of the inner peripheral seal member 58 in addition to or instead of the hardness of the inner peripheral seal member 58.

The output variable of the map M may be the degree of degradation indicating comprehensively evaluated degradation of the inner peripheral seal member 58, rather than a variable indicating a numerical value such as hardness. In this case, for example, the output variable indicating the degree of degradation may be a value that varies between "0" and "1," where "0" indicates the state immediately after manufacturing in which degradation has not progressed at all and "1" indicates the state in which degradation has progressed and the inner peripheral seal member 58 needs to be replaced.

The output variable of the map M may be a value indicating a period until the inner peripheral seal member 58 needs to be replaced, that is, a value indicating the remaining life of the inner peripheral seal member 58. In this case, when the CPU 91 determines that the value indicating the remaining life of the inner peripheral seal member 58 is equal to or less than a predetermined threshold of the remaining life, the CPU 91 determines that the inner peripheral seal member 58 needs to be replace with a new inner peripheral seal member 58. The remaining life of the inner peripheral seal member 58 decreases as degradation of the inner peripheral seal member 58 progresses. Accordingly, it can be said that the remaining life of the inner peripheral seal member 58 is one of the output variables indicating the degree of degradation of the inner peripheral seal member 58.

About Estimation Control

In the above embodiment, the timing at which the estimation control is performed is not limited to the example of the above embodiment. For example, the estimation control may be performed in predetermined cycles.

About Mapping

In the above embodiment, the activation functions of the map M are shown by way of example and are not limited to the example of the above embodiment. For example, the activation functions of the map M may be a softmax function etc.

In the above embodiment, the neural network with one intermediate layer is illustrated as a neural network. However, the neural network may have two or more intermediate layers.

In the above embodiment, the fully connected feedforward neural network is illustrated as a neural network. However, the neural network is not limited to the fully connected feedforward neural network. For example, the neural network may be a recurrent neural network.

In the above embodiment, the function approximator serving as the map M is not limited to the neural network. For example, the function approximator may be a regression equation having no intermediate layer.

About Seal Member

In the above embodiment, the seal member whose degree of degradation is to be estimated is not limited to the example of the above embodiment. For example, the seal member whose degree of degradation is to be estimated may be the outer peripheral seal member 59 in addition to or instead of the inner peripheral seal member 58.

The seal member whose degree of degradation is to be estimated may be various seal members in the first brake mechanism B1 and the second brake mechanism B2 in addition to or instead of the inner peripheral seal member 58 and the outer peripheral seal member 59 in the first clutch C1 and the second clutch C2. In the case where the degree of degradation of other seal member(s) is estimated in addition to the inner peripheral seal member 58, a map for other seal member(s) is defined in the mapping data 94A separately from the map for the inner peripheral seal member 58.

In the above embodiment, the seal member is not limited to the example of the above embodiment. For example, the seal member need not necessarily be attached to the piston 57C. The seal member may be any seal member on which a load acts when the engagement element is switched from the disengaged state to the engaged state or is switched from the engaged state to the disengaged state. As a specific example, in the case of a seal member that reduces the possibility of leakage of oil from the inside to the outside of the engagement element, the pressure of oil supplied to the engagement element changes when the engagement element is switched from the disengaged state to the engaged state or is switched from the engaged state to the disengaged state. At this time, the oil pressure applied to the seal member also changes accordingly. As a result, a load acts on the seal member according to the operation of the engagement element. Degradation of the seal member therefore progresses as the number of times the engagement element has been operated increases. Accordingly, in the case where a load acts on the seal member according to the operation of the engagement element as described above, the technique of the present disclosure can be applied to estimate the degree of degradation of this seal member.

About Sensors

In the above embodiment, the positions where the various sensors are mounted are not limited to the example of the above embodiment. For example, since the temperature of oil supplied from the hydraulic device 65 to the engagement element may be different among the engagement elements, the temperature of oil to which the inner peripheral seal member 58 is exposed is not always the same among the engagement elements. In this case, the temperature sensor 74 may be mounted for each engagement element.

About Degradation Estimation Device

The degradation estimation device mounted on the vehicle 100 is described in the above embodiment. However, the degradation estimation device need not necessarily be mounted on the vehicle 100. For example, the degradation estimation device may be installed in a dealership etc. that carries out vehicle maintenance. In this case, various values including at least the thermal history variable and the load history variable are stored in the storage device 94 of the vehicle. The degradation estimation device installed in the dealership etc. acquires various values stored in the storage device 94 of the vehicle during maintenance of the vehicle etc. The degradation estimation device then estimates the degree of degradation of the inner peripheral seal member 58 by inputting the acquired various values to the map M and calculating the output variable. The degradation estimation device can also be regarded as a computer-readable non-transitory storage medium having programs stored therein.

About Execution Device

In the above embodiment, the execution device is not limited to a device that includes the CPU 91 and the ROM 93 and performs processing by software. As a specific example, the execution device may include a dedicated hardware circuit such as an application-specific integrated circuit (ASIC) that performs at least a part of the processing that is performed by software in the above embodiment by hardware. That is, the execution device need only have any of the following configurations (a) to (c).

(a) The execution device includes a processing device that performs all of the above processing according to programs and a program storage device such as a ROM that stores the programs.

(b) The execution device includes a processing device that performs a part of the above processing according to programs, a program storage device, and a dedicated hardware circuit that performs the rest of the processing.

(c) The execution device includes a dedicated hardware circuit that performs all of the above processing. There may be a plurality of the software execution devices that include the processing device and the program storage device, and a plurality of the dedicated hardware circuits.

About Vehicle

In the above embodiment, what is called a series-parallel hybrid vehicle is illustrated as an example of the vehicle. However, the vehicle is not limited to the series-parallel hybrid vehicle. For example, the vehicle may be a series hybrid vehicle or a parallel hybrid vehicle.

In the above embodiment, the vehicle is not limited to the vehicle including the internal combustion engine and the motor generator. For example, the vehicle may be a vehicle including an internal combustion engine but not a motor generator, or may be a vehicle including a motor generator but not an internal combustion engine.

What is claimed is:

1. A degradation estimation device that is applied to a vehicle equipped with an automatic transmission including either or both of a clutch and a brake as an engagement element and that is configured to estimate a degree of degradation of a seal member attached to the engagement element of the automatic transmission, the degradation estimation device comprising:

a storage device configured to store mapping data that defines a map that outputs an output variable indicating the degree of degradation of the seal member when an input variable is input, the map including a thermal history variable and a load history variable as the input variable, the thermal history variable being a variable indicating a period during which the seal member has been exposed to a temperature within a predetermined temperature range, and the load history variable being a variable indicating the number of times a load has acted on the seal member; and an execution device configured to perform an acquisition process and a calculation process, the acquisition process being a process of acquiring the input variable, and the calculation process being a process of outputting a value of the output variable by inputting the input variable acquired in the acquisition process to the map.

2. The degradation estimation device according to claim 1, wherein when the predetermined temperature range is a first temperature range and the thermal history variable is a first thermal history variable, the map includes a second thermal history variable as the input variable, and the second thermal history variable is a variable indicating a period during which the seal member has been exposed to a temperature within a second temperature range, the second temperature range being a predetermined temperature range different from the first temperature range.

3. The degradation estimation device according to claim 1, wherein when the predetermined temperature range is a first temperature range, the execution device is configured to calculate a corrected period and acquire, as the thermal history variable, a variable indicating a sum of a period during which the seal member has been exposed to a temperature within the first temperature range and the corrected period in the acquisition process, and the corrected period is calculated by correcting a period during which the seal member has been exposed to a temperature within a second temperature range by a predetermined value, the second temperature range being a predetermined temperature range different from the first temperature range.

4. The degradation estimation device according to claim 1, wherein the load history variable is the number of engagements, the number of engagements being the number of times the engagement element has been engaged since the seal member was attached to the engagement element.

5. The degradation estimation device according to claim 1, wherein:
the engagement element includes a first component and a second component, the first component and the second component being configured to move relative to each other when the engagement element switches between an engaged state and a disengaged state;
the seal member is disposed in clearance between the first component and the second component and is configured to slide along the second component when the first component moves relative to the second component; and
the load history variable is the corrected number of engagements, the corrected number of engagements being obtained by correcting the number of engagements by a value indicating sliding resistance of the seal member along the second component, the number of engagements being the number of times the engagement element has been engaged since the seal member was attached to the engagement element.

6. The degradation estimation device according to claim 1, wherein the load history variable is a distance traveled by the vehicle since the seal member was attached to the engagement element.

7. The degradation estimation device according to claim 1, wherein the map includes, as the input variable, a vehicle speed variable indicating an average vehicle speed of the vehicle since the seal member was attached to the engagement element.

8. The degradation estimation device according to claim 1, wherein:
the engagement element includes a first component and a second component that are separated from each other;
the seal member is disposed in clearance between the first component and the second component; and
the map includes, as the input variable, a clearance variable indicating a dimension of the clearance.

9. The degradation estimation device according to claim 1, wherein:
the engagement element includes a first component and a second component that are separated from each other;
the seal member is disposed in a compressed state in clearance between the first component and the second component; and
the map includes, as the input variable, a compression variable indicating a difference between an uncompressed dimension of a part of the seal member that is to be located in the clearance and a dimension of the clearance.

10. The degradation estimation device according to claim 1, wherein the output variable is a variable indicating hardness of the seal member.

11. A degradation estimation method that is applied to a vehicle equipped with an automatic transmission including either or both of a clutch and a brake as an engagement element to estimate a degree of degradation of a seal member attached to the engagement element of the automatic transmission, the method comprising causing a degradation estimation device to calculate a value of an output variable by inputting a thermal history variable and a load history variable as an input variable to the degradation estimation device, wherein the thermal history variable is a variable indicating a period during which the seal member has been exposed to a temperature within a predetermined temperature range, the load history variable is a variable indicating the number of times a load has acted on the seal member, the degradation estimation device stores mapping data, and the mapping data defines a map that outputs the output variable indicating the degree of degradation of the seal member when the input variable is input.

12. A non-transitory storage medium that serves as a degradation estimation device applied to a vehicle equipped with an automatic transmission including either or both of a clutch and a brake as an engagement element and configured to estimate a degree of degradation of a seal member attached to the engagement element of the automatic transmission, that includes mapping data defining a map that outputs an output variable indicating the degree of degradation of the seal member when an input variable is input, and that stores instructions that are executable by one or more processors and that cause the one or more processors to perform functions comprising:
acquiring the input variable, the input variable including at least either a thermal history variable or a load history variable, the thermal history variable being a variable indicating a period during which the seal member has been exposed to a temperature within a predetermined temperature range, and the load history variable being a variable indicating the number of times a load has acted on the seal member; and
calculating a value of the output variable by inputting the acquired input variable to the map.

* * * * *